United States Patent [19]
Wolda et al.

[11] Patent Number: 5,664,289
[45] Date of Patent: Sep. 9, 1997

[54] HINGE STRAP ASSEMBLY WITH CONVOLUTED TORQUE ROD

[75] Inventors: Tiete O. Wolda, Scarborough; Randolph Dale Lewkoski, Penetanguishene, both of Canada

[73] Assignee: M & C Corporation, Warren, Mich.

[21] Appl. No.: 733,467

[22] Filed: Oct. 16, 1996

Related U.S. Application Data

[63] Continuation of Ser. No. 503,605, Jul. 18, 1995, abandoned.

[51] Int. Cl.$^6$ .................................................. E05F 1/12
[52] U.S. Cl. .................. 16/298; 16/308; 16/386; 267/154
[58] Field of Search ............... 16/75, 288, 290, 16/308, 298, 386; 280/21, 69; 296/76; 160/191, 192; 267/154, 273, 277

[56] References Cited

U.S. PATENT DOCUMENTS

| | | | |
|---|---|---|---|
| 423,157 | 3/1890 | Hubbard | 267/273 |
| 2,091,673 | 8/1937 | Orlow . | |
| 2,188,891 | 1/1940 | Haltenberger . | |
| 2,702,401 | 2/1955 | Vigmostad et al. | 296/76 |
| 2,707,799 | 5/1955 | Butterfield | 16/308 |
| 2,783,495 | 3/1957 | Vigmostad . | |
| 2,810,153 | 10/1957 | Semar . | |
| 2,821,942 | 2/1958 | Goodwin | 16/298 |
| 2,869,959 | 1/1959 | Kesling | 16/308 |
| 2,871,505 | 2/1959 | Clark et al. | 296/76 |
| 2,895,161 | 7/1959 | Badura | 16/294 |
| 2,948,917 | 8/1960 | Campbell et al. . | |
| 3,153,257 | 10/1964 | Daenzer . | |
| 3,153,258 | 10/1964 | Badura . | |
| 3,163,409 | 12/1964 | Running et al. | 267/154 |
| 3,166,783 | 1/1965 | Mackie et al. | 16/308 |
| 3,339,969 | 9/1967 | Bridle et al. . | |
| 3,370,317 | 2/1968 | Marchione . | |
| 3,402,508 | 9/1968 | Kessler . | |
| 3,695,678 | 10/1972 | Gergoe . | |
| 4,291,501 | 9/1981 | Steinberg et al. | 16/308 |
| 4,378,658 | 4/1983 | DeLorean . | |
| 4,402,111 | 9/1983 | Selby et al. . | |
| 4,706,334 | 11/1987 | Beckwith | 16/308 |
| 4,949,424 | 8/1990 | Komaki . | |
| 4,953,260 | 9/1990 | Fargnier . | |
| 5,001,810 | 3/1991 | Baer . | |
| 5,235,726 | 8/1993 | Geier et al. | 16/334 |
| 5,240,319 | 8/1993 | Koga . | |
| 5,243,738 | 9/1993 | Kiefer . | |
| 5,253,391 | 10/1993 | Ojima . | |
| 5,373,665 | 12/1994 | Lyons, Sr. | 16/308 |
| 5,419,012 | 5/1995 | Lewis | 296/76 |

FOREIGN PATENT DOCUMENTS

| | | | |
|---|---|---|---|
| 892418 | 4/1944 | France | 267/273 |
| 14930 | of 1889 | United Kingdom | 267/154 |
| 1086385 | 10/1967 | United Kingdom | 16/298 |
| 2069037 | 8/1981 | United Kingdom . | |

*Primary Examiner*—Maurina T. Rachuba
*Assistant Examiner*—Donald M. Gurley
*Attorney, Agent, or Firm*—Brooks & Kushman P.C.

[57] ABSTRACT

The present invention comprises a hinge strap assembly including a torque rod spring assembly having a torque rod. The torque rod has a pair of end portions connected by a convoluted portion. The convoluted portion has a plurality of legs connected by at least one U-shaped bight portion. A slider block and/or pivot block may be clampingly mounted on the convoluted portion to vary the stiffness of the torque rod spring assembly. The hinge strap assembly may include a hinge box, a hinge strap and a single convoluted torque rod which connects therebetween. Alternatively, the hinge strap may be boxless having a hinge strap and a torque rod upon which the hinge strap is pivotally mounted. An end of the torque rod may be directly affixed to the rear shelf thereby eliminating the conventional hinge box. An insert may be used to pivotally mount the torque rod within the hinge strap.

21 Claims, 6 Drawing Sheets

HINGE STRAP ASSEMBLY WITH CONVOLUTED TORQUE ROD

This is a continuation of application Ser. No. 08/503,605 filed on Jul. 18, 1995, now abandoned.

TECHNICAL FIELD

The present invention relates generally to hinge strap assemblies, and more particularly, to hinge strap assemblies which utilize torque rods to bias hinge straps to open or closed positions.

BACKGROUND ART

A conventional deck lid or hood of a vehicle is generally quite heavy. Accordingly, they are pivotally attached to a vehicle body using hinge strap assemblies and are typically spring biased toward an open position. This biasing eases the burden on a vehicle operator in opening a deck lid or hood.

A first or proximate end of a hinge strap is pivotally attached relative to the vehicle body. A second or distal end is affixed to the deck lid or hood. With respect to hinge strap assemblies for deck lids, hinge boxes generally bolt beneath the back shelf and rear window of a vehicle. A pair of spaced apart ears on each hinge box supports a pivot pin which extends through the proximate end of a respective hinge strap. These hinge boxes are relatively complex in configuration and rather expensive to manufacture.

A common method of biasing the hinge straps open is to provide a pair of cooperating torque rods. One end of each torque rod is anchored to the vehicle or a hinge box adjacent a respective hinge strap. The other end of each torque rod is attached to the respective hinge strap on the opposite side of the vehicle. Consequently, each torque rod extends across the width of the vehicle criss-crossing with the other torque rod.

When the deck lid or hood is closed, one end of each torque rod is moved through an arcing or curvilinear translational motion causing another portion of the torque rod to twist in torsion thereby storing energy. When the deck lid or hood is opened, the torque rods are unwound releasing energy and assisting in biasing the deck lid or hood to an open position.

Several drawbacks exist with the above described hinge strap as assemblies and their torque rods or springs. First, torque rods which span transversely across the width of a vehicle from hinge strap to hinge strap occupy a significant amount of space in a vehicle trunk or engine compartment. Thus, these torque rods can cause interference in the centerline of a vehicle containing these criss-crossing torque rods. Second, these torque rods are generally designed to have a fixed spring rate and are not readily variable in stiffness and energy storage capacity. Finally, using hinge boxes adds significantly to the expense and complexity of hinge strap assemblies.

The present invention is intended to overcome these shortcomings.

SUMMARY OF THE INVENTION

The present invention includes a torque rod spring assembly. The spring assembly includes a convoluted torque rod and may have a pivot block and/or a slider block. The torque rod has a first end portion, a second end portion and a convoluted portion extending therebetween. The convoluted portion includes a first leg, a second leg and a first U-shaped bight portion connecting between the first and second legs. The pivot block has at least two apertures therein through which legs of the convoluted portion pass with the first and second end portions extending generally perpendicular to the axis of the apertures. The first and second end portions can be translated through an arc relative to the pivot block causing the convoluted portion to twist in torsion storing energy.

The slider block has first and second bores through which the first and second legs extend. If a pivot block is employed, the slider block is located between the pivot block and a distant bight portion.

The convoluted portion may also include third and fourth legs and second and third U-shaped bight portions connecting with the first and second legs and the first bight portion. The slider block may then have additional bores therein for clamping about the additional respective legs of the torque rod. Ideally, the slider block is adjustably clampable along the lengths of the legs to vary the spring rate of the torque rod spring assembly. The bores of the slider block or the apertures of the pivot block may be lined with an anti-friction material. This material allows the torque rod to easily twist in torsion within the blocks while maintaining a spaced relationship of the legs relative to one another in the blocks.

The present invention also includes a hinge strap assembly for pivotally attaching a cover, such as a deck lid or hood, to a vehicle body. The hinge strap assembly may comprise a hinge box, a hinge strap attached thereto using a pivot pin, and a torque rod spring assembly. The hinge box is securable to the vehicle body. The hinge strap has a proximate end with a pin aperture therein and a distal end securable to the cover. The hinge pin extends through the pin aperture attaching the hinge strap to the hinge box. The torque rod spring assembly includes a torque rod with a first end portion, a second end portion, and a convoluted portion connecting therebetween. The first and second end portions of the torque rod extend at least partially perpendicular to the first and second legs. The first end portion attaches relative to the hinge box and the second end portion attaches relative to the hinge strap.

When the hinge strap is pivoted relative to the mounting box, the first and/or second end portions are translated along a curvilinear path relative to the convoluted portion causing the convoluted portion to twist in torsion. The convoluted portion may include third and fourth legs and second and third U-shaped bight portions connecting to the first and second legs and the first bight portion. Also, it is possible to employ the pivot block or the slider block described above to vary the spring rate of the torque rod assembly. The convoluted torque rod extends only partially across the width of the vehicle.

As an alternative, another hinge strap assembly is provide for attaching a cover, such as a hood or deck lid, to the vehicle body. The hinge strap assembly comprises a hinge strap and a torque rod assembly. The hinge strap has a distal end for attaching to the cover and a proximate end. The torque rod spring assembly includes a torque rod having a first end portion which is adapted to be mounted to the vehicle body and a second end which is attached relative to the hinge strap. The torque rod extends through the end of the hinge strap with the torque rod serving as a pivot pin when the first end portion is secured to the vehicle body. Therefore, this hinge strap assembly does not require a conventional hinge box with a discrete hinge pin.

The hinge strap assembly may include an insert which fits in the proximate end of the hinge strap with the torque rod extending through the insert. The insert may include a main body and a retainer portion. The main body cooperates with the retainer portion to pivotally capture the torque rod within the insert and hinge strap.

It is an object of the present invention to a provide a boxless hinge strap assembly which is, compared to conventional hinge assemblies with hinge boxes, reduced in weight, more economical to make including manufacture and tool-up, simpler in design, requires less critical dimensioning of parts, and is generally weld free and allows for quick assembly and disassembly.

It is another object to provide a boxless hinge strap assembly wherein a torque rod is used both as a hinge pin and in mounting a hinge strap to a vehicle body.

Another object is to provide a hinge strap assembly including a convoluted torque rod which is more compact in overall length than conventional torque rods.

An additional object is to provide a convoluted torque rod with a plurality of bight portions and legs which can greatly increase the energy storing of the torque rod without adding to the overall length of the torque rod.

A further object is to provide a torque rod spring assembly with a convoluted torque rod including a pivot block or a slider block, or both, such that the spring rate of the spring assembly can be readily adjusted.

BRIEF DESCRIPTION OF THE FIGURES

These and other features, objects and advantages of the present invention will become readily apparent from the following description, pending claims, and accompanying sheets of drawings where:

BEST MODE FOR CARRYING OUT THE INVENTION

Figures 1, 2A, 2B, 2C:
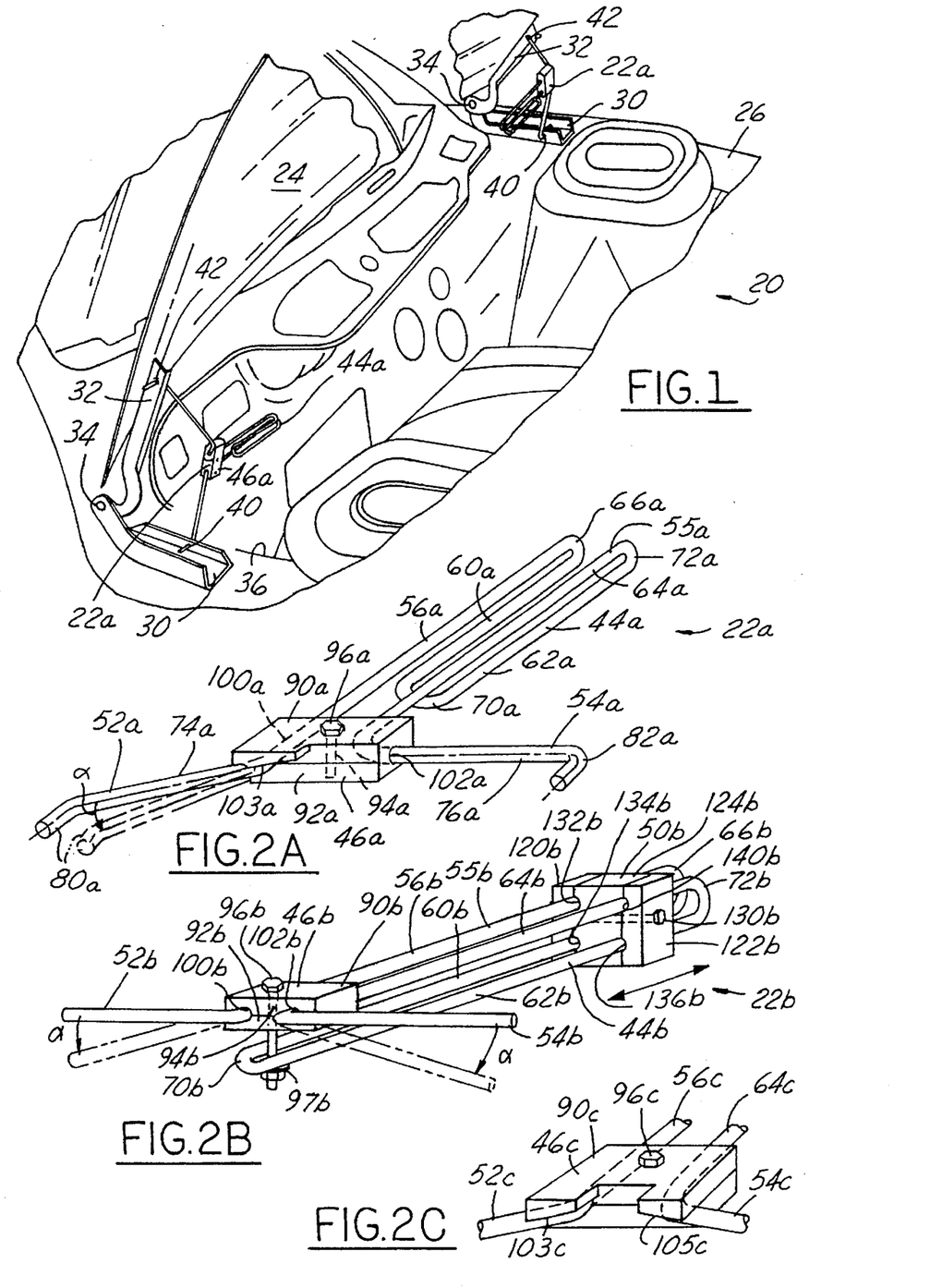
FIG. 1 is a fragmentary perspective view, partially in cutaway, of a pair of convoluted torque rod assemblies, made in accordance with the present invention, biasing a hood of a vehicle open.
FIGS. 2A-C are perspective views of various embodiments of convoluted torque rods with pivot blocks which may be used with the vehicle of FIG. 1.

A vehicle 20 is illustrated in FIG. 1 which utilizes a pair of torque rod spring assemblies 22a made accordance with the present invention. Torque rod spring assemblies 22a are used to bias open a vehicle hood 24. Attached to a vehicle body 26 are a pair of U-shaped brackets 30. Likewise, affixed beneath hood 24 are a pair of hinge straps 32. Hinge pins 34 are used to attach respective hinge straps 32 to vehicle body 26 to allow hood 24 to pivot open and close relative to a hood opening 36. Brackets 30 and hinge straps 32 each have respective apertures 40 and 42 to receive end portions of torque rod spring assemblies 22a. Each of torque rod spring assemblies 22a extend between respective apertures 40 and 42. Closing and opening hood 24 results in torque rod spring assemblies 22a deforming to store and release energy.

One of torque rod spring assemblies 22a is shown in greater detail in FIG. 2A. The other torque rod spring assembly 22a is generally of identical configuration and will not be further described. Torque rod spring assembly 22a of FIG. 2A includes a convoluted torque rod 44a and a pivot block 46a.

Convoluted torque rod 44a comprises a pair of end portions 52a and 54a and a convoluted or loop portion 55a connecting therebetween. Convoluted portion 55a includes elongate straight legs 56a, 60a, 62a and 64a. U-shaped bight portions 66a, 70a and 72a connect respective legs 56a and 60a, 60a and 62a, and 62a and 64a. End portions 52a and 54a include respective arc portions 74a and 76a and terminal portions 80a and 82a. Convoluted torque rod 44a is shown in FIG. 2A in an initially preloaded state in full lines and further deformed in broken lines. Note arc portion 74a pivots with respect to pivot block 46a through an arc angle α along a curvilinear path increasing the torsional energy in torque rod 44a. In a free state, end portions 52a and 54a normally lie in the same plane.

Pivot block 46a includes first and second block halves 90a and 92a. Block halves 90a and 92a include coaxially aligned bolt apertures which cooperate to form a through bore 94a in pivot block 46a. Bore 94a receives a threaded fastener 96a to sandwich block halves 90a and 92a together. Block halves 90a and 92a each have a pair of opposing semi-cylindrical grooves formed therein which cooperate to form a pair of bores 100a and 102a in pivot block 46a. Bores 100a and 102a support respective legs 56a and 64a of torque rod 44a when block halves 90a and 92a are sandwiched together about torque rod 44a. Bore 100a is straight allowing leg 56a to freely rotate therein. Conversely, bore 102a is L-shaped and prevents leg 64a from rotating within bore 102a. An inclined stop surface 103a keeps torque rod 44a displaced from its free state thereby maintaining a preload at all times on torque rod 44a. Again, in this preferred embodiment, only arc portion 74a is permitted to rotate or pivot relative to pivot block 46a.

An alternative embodiment of a torque rod spring assembly 22b is shown in FIG. 2B. Numeral designations for components corresponding to those of torque rod spring assembly 22a, shown in FIG. 2A, are the same; however, the letter designation "b" is used to identify components associated with this second embodiment. Likewise letter designations "c" and "d" are used with third and fourth embodiments in FIG. 2C and FIGS. 2D-F.

Torque rod spring assembly 22b includes a torque rod 44b, a pivot block 46b and a slider block 50b. Slider block 50b may be adjustably positioned along torque rod 44b to vary the stiffness of torque rod spring assembly 22b.

Torque rod 44b includes end portions 52b and 54b and an intermediate convoluted portion 55b. Convoluted portion 55b comprises leg 56b, 60b, 62b and 64b along with bight portions 66b, 70b and 72b. Pivot block 46b includes block halves 90b and 92b. In this embodiment, bores 100b and 102b are straight allowing both of end portions 52b and 54b to pivot relative to pivot block 46b. A fastener 96b passes through a bore 94b in pivot block 46b. A washer 97b mounted on fastener 96b keeps bight portion 70b located adjacent pivot block 46b.

Slider block 50b includes outer blocks 120b and 122b and an intermediate block 124b captured therebetween. Slider block 50b has a transverse aperture formed by cooperating holes in each of blocks 120b, 122b and 124b. A threaded fastener 130b is received through the aperture to clamp blocks 120b, 122b and 124b together. Four bores 132b, 134b, 136b and 140b are formed by cooperating semi-cylindrical grooves machined into blocks 120b, 122b and 124b. Legs 56b 60b, 62b and 64b pass through respective bores 132b, 134b, 136b and 140b when slider block 50b is mounted about torque rod 44b.

Bores 134b and 140b in slider block 50b and bores 100b and 102b in pivot block 46b frictionally engage torque rod 44b when clamped thereabout. Preferably, bores 132b and 136b are clearance holes and do not impede the rotation of torque rod 44b therein. This arrangement prevents pivot block 46b and slider block 50b from sliding longitudinally along legs 60b, 62b, 64b and 66b of convoluted portion 55b. However, the frictional engagement is sufficiently small so as to allow torque rod 44b to rotate or twist relatively freely within slider block 50 and pivot block 46. Although not preferred, bores 132b, 134b, 136b and 140b of slider block 50b may be lined with a lubricant or an insert (not shown) such a teflon or the like, to facilitate the rotation of torque rod 44b within blocks 46b or 50b. The lubrication helps minimize noise and vibration.

Figure 3:
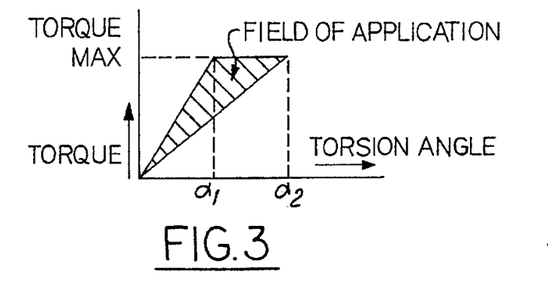
FIG. 3 is a graph illustrating that the spring stiffness of the convoluted torque rod assembly of FIG. 2B can be adjusted.

Pivot block 46b and slider block 50b can be clamped at different locations along convoluted portion 55b to change the spring rate of torque rod 44b. FIG. 3 illustrates a graph depicting this change in spring rate. For example if pivot block 46b and slider block 50b are distally spaced apart disposed adjacent respective bight portions 70b and 66b, torque rod spring assembly 22b will have its greatest spring rate or stiffness and will store a maximum of energy for a given arcuate displacement of arc portions 74b and 76b, such as $\alpha_1$. By moving pivot block 46b and slider block 50b closer together, the spring rate of spring assembly 22b will be lowered. Therefore, torque rod 44b will have to be rotated through a larger angle of rotation, or $\alpha_2$, to store the same amount of energy as when slider block 50b and pivot block 46b are spaced farther apart. The movement of slider block 50b away from bight portions 66b and 72b allows bight portions 66b and 72b to more freely translate relative to one another softening the spring rate of torque rod spring assembly 22b.

While pivot block 46b is shown with only two bores 100b and 102b, it is possible to place two additional bores therein. Accordingly, all of legs 56b, 60b, 62b, and 64b can be held, resulting in legs 56b, 62b and 64b remaining parallel to one another and displacing generally only torsionally.

Torque introduced into legs 56b and 64b cause bights 66b and 72b to twist. If slider block 50b is located adjacent to pivot block 46, bights 66 and 72 are relatively free to rotate. Moving slider block 50b towards bights 66b and 72b will place more restraint on this twisting action of bights 66b and 72b. Finally, when slider block 50b is directly adjacent bights 66b and 72b, these bights cannot rotate and little torque can then be transmitted to legs 60b and 62b.

FIG. 2C illustrates a pivot block 46c having a pair of inclined stop sections 103c and 105c formed on a block half 90c. This arrangement allows a preload to be placed on a convoluted torque rod 44c held within pivot block 46c with end portions 52c and 54c being free to pivot within pivot block 46c.

Figure 2D:
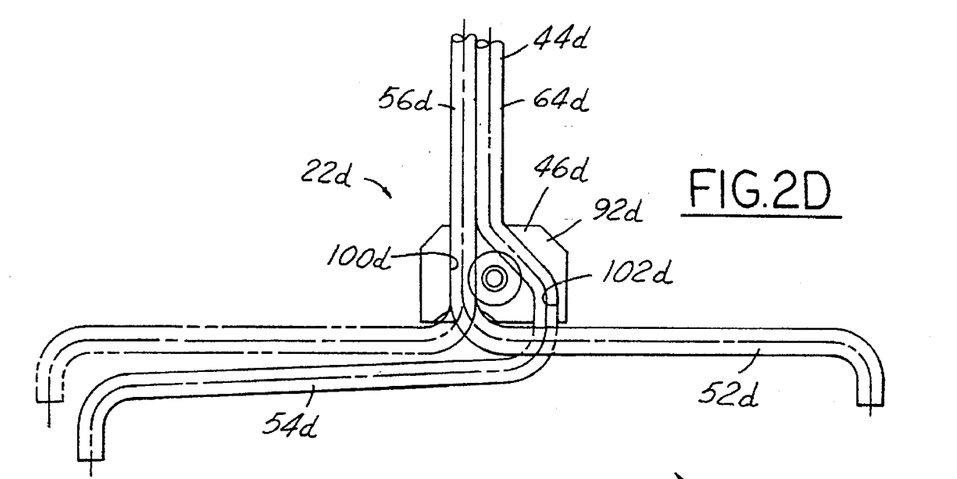
FIGS. 2D-F shows a fourth embodiment of a torque rod spring assembly.
Figure 2E:
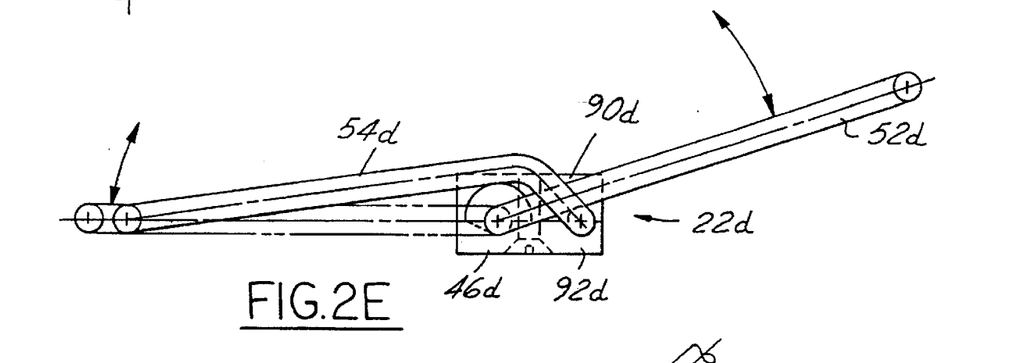
Figure 2F:
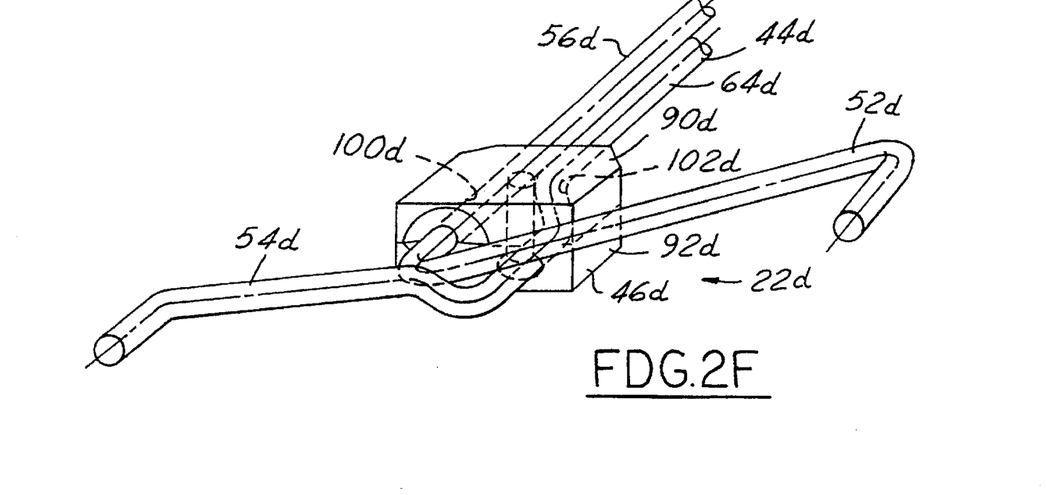

FIGS. 2D–F show a third alternative embodiment of a torque rod spring assembly 22d. Torque rod spring assembly 22d includes pivot block 46d which receives torque rod 44d (only a fragmentary portion shown) therethrough.

Pivot block 46d includes block halves 90d and 92d with straight bore 100d and curved bore 102d formed therein. Fastener 96d secures block halves 90d and 92d together. Convoluted rod 44d includes legs 56d and end portions 52d and 54d. Legs 56d and 64d are held within respective bores 100d and 102d. Accordingly, leg 56d and end portion 52d are free to rotate while leg 64d and end portion 54d are fixed against rotation. As best seen in FIGS. 2D and 2F, end portion 52d is limited in its movement by abutting against end portion 54d. Consequently, torque rod spring assembly 22d can be assembled with a preload.

Figure 4A:
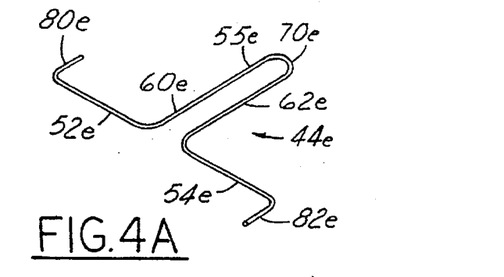
FIG. 4A-D are perspective views of other embodiments of convoluted torque rods.
Figures 4B, 4C, 4D, 5:
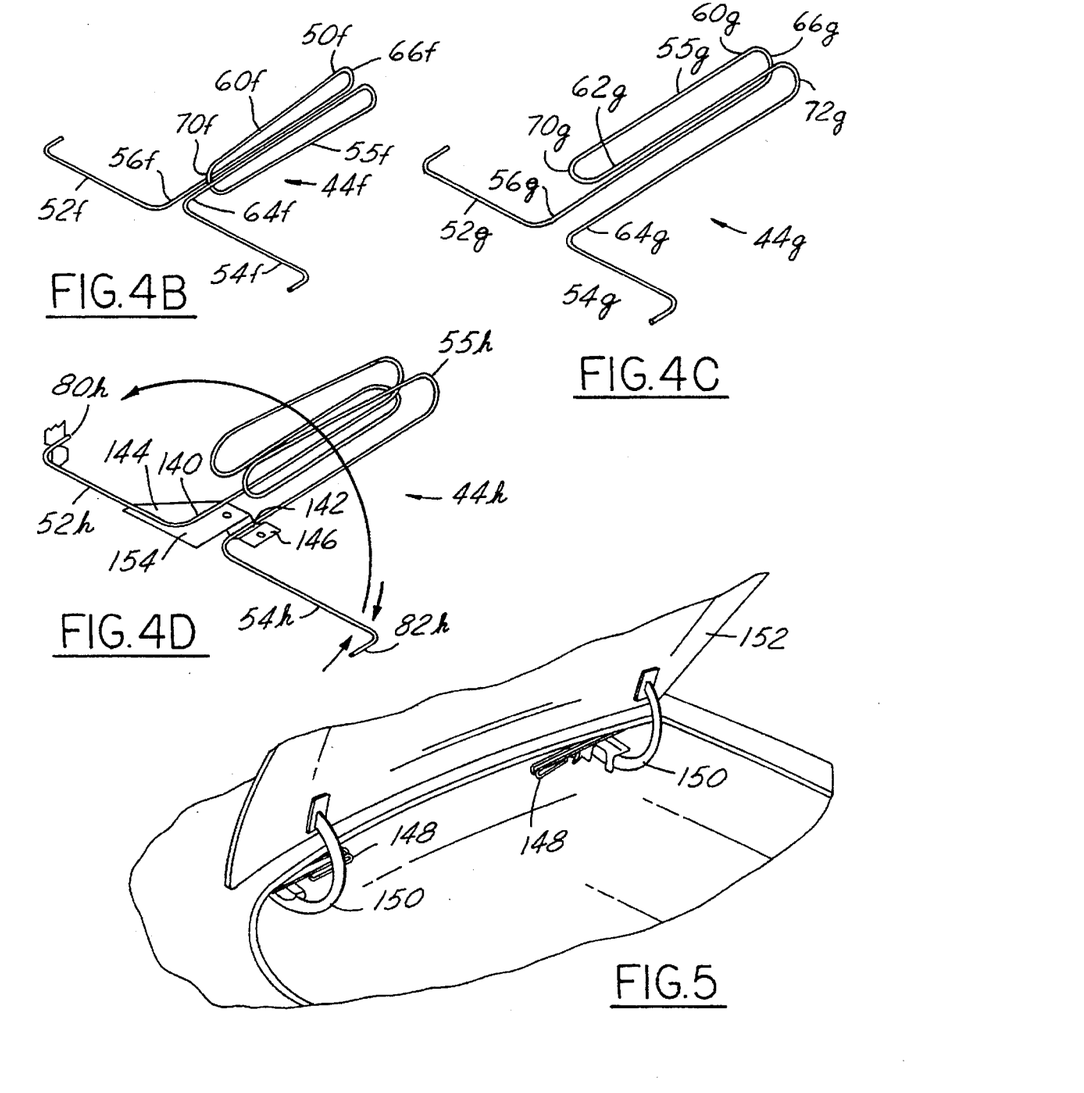
FIG. 5 is a fragmentary perspective view of a vehicle utilizing a pair of convoluted torque rod assemblies which bias hinge straps to hold open a deck lid.

FIGS. 4A–C show alternative embodiments for torque rods 44e–g. Portions of these torque rods which correspond to like portions of torque rod 44a are identified by like reference numbers and a letter designation. Each of torque rods 44e–g has respective end portions 52e–g and 54e–g which are connected by convoluted portions 55e–g. The number of loops or legs and bight portions can be varied. For example, torque rod 44e has only a single loop with legs 60e and 62e connected by bight portion 70e. Torque rods 44f and 44g have respective legs 56f and g, 60f and g, 62f and g, and 64f and g, connected by bight portions 66f and g, 70f and g, and 72f and g.

These torque rods 44e–g can be used with pivot blocks and slider blocks as described above with respect to torque rods 44a–c in FIGS. 2A–C to alter their stiffness. Alternatively, they can be used with only a pivot block or only a slider block.

Another alternative embodiment of a torque rod 44h is shown in FIG. 4D. In this application, terminal portions 80h and 82h of end portions 52h and 54h are movable rather than fixed to a stationary structure. A pair of mounting grooves 140 and 142 formed in sheet metal components 144 and 146 serve as pivot means rather than using a discrete pivot block as in FIGS. 2A–C. A slider block (not shown) can be clamped about convoluted portion 55h if the stiffness and energy storage in this application is to be increased or made variable.

Another use for a pair of convoluted torque rods 148 is in combination with hinge straps 150 and a lid or trunk 152, as shown in FIG. 5. A pair of torque rods 148 are used to bias open a deck lid 152. As shown in FIG. 5, neither of torque rods 148 extend fully between hinge straps 150. Conventionally, criss-crossing torque rods for vehicle deck lids extend fully between hinge straps.

Figure 6:
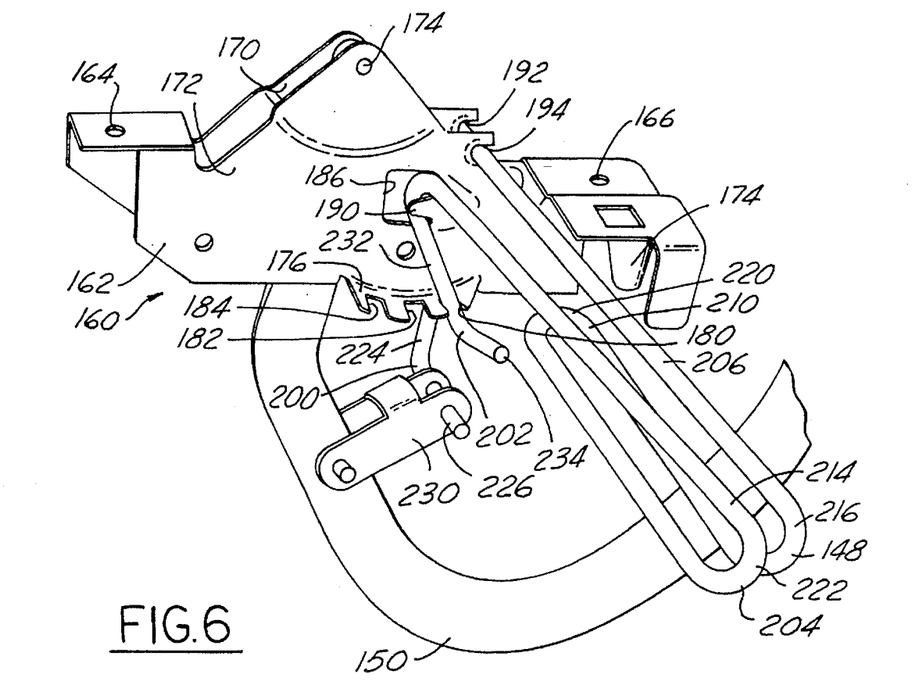
FIG. 6 is a fragmentary perspective view of a single convoluted torque rod used to bias open a corresponding hinge strap.

FIG. 6 shows a hinge strap assembly 160 including one of convoluted torque rods 148 and one of hinge straps 150. A hinge box 162 is adapted to secure to the rear shelf of a vehicle (not shown) by threaded fasteners passing through apertures 164 and 166. Hinge box 162 includes a pair of transversely spaced apart plates 170 and 172. A hinge pin 174 extends between plates 170 and 172 to pivotally support a proximate end of hinge strap 150. Hinge strap 150 swings between plates 170 and 172. An elastomeric bumper stop 174 is retained on hinge box 162 to limit the arcuate range of motion of hinge strap 150. Formed on the side of plate 172 is a transversely extending notch plate 176 having arcuately spaced notches 180, 182 and 184. Plate 172 also has an opening 186 having a retaining tab 190. At the rear of plates 170 and 172 are a pair of transversely spaced apart retaining grooves 192 and 194.

Convoluted torque rod 148 is used with hinge box 162 and hinge strap 150. Torque rod 148 includes a first end portion 200, a second end portion 202 and an intermediate convoluted portion 204. Convoluted portion 204 includes legs 206, 210, 212 and 214 joined by bight portions 216, 220 and 222. First end portion 200 has an arcuate portion 224 and a terminal portion 226 which attaches to a link 230. Second end portion 202 comprises an arcuate portion 232 and a terminal portion 234. As shown in FIG. 6, terminal portion 226 is attached to one end of link 230. The other end of link 230 attaches to hinge strap 150. The end of convoluted portion 204, which connects with arcuate portion 224, is pivotally supported within retaining grooves 192 and 194. Arcuate portion 232 is supported behind retaining tab 190 proximate convoluted portion 204. Also, arcuate portion 232 is held within retaining notch 180 of notch plate 176. By varying which of notches 180, 182 or 184 in which arcuate portion 232 is secured, the amount of bias provided to open deck lid 152 can be adjusted. When hinge strap 150 swings open, link 230 is pushed rearwardly by hinge strap 150 rotating arcuate portion 224 about retaining grooves 192 and 194. This, in turn, causes convoluted portion 204 to twist in torsion storing energy. Convoluted portion 204 is not free to rotate as arcuate portion 232 is anchored by hinge box 162.

Referring now to FIGS. 7–10, a boxless hinge strap assembly 248 has a torque rod 250 which serves as a hinge pin for a hinge strap 252. A corresponding hinge strap assembly (not shown) is located on the side of the vehicle and employs a torque rod 251 which anchors to hinge strap assembly 248.

Figure 7:
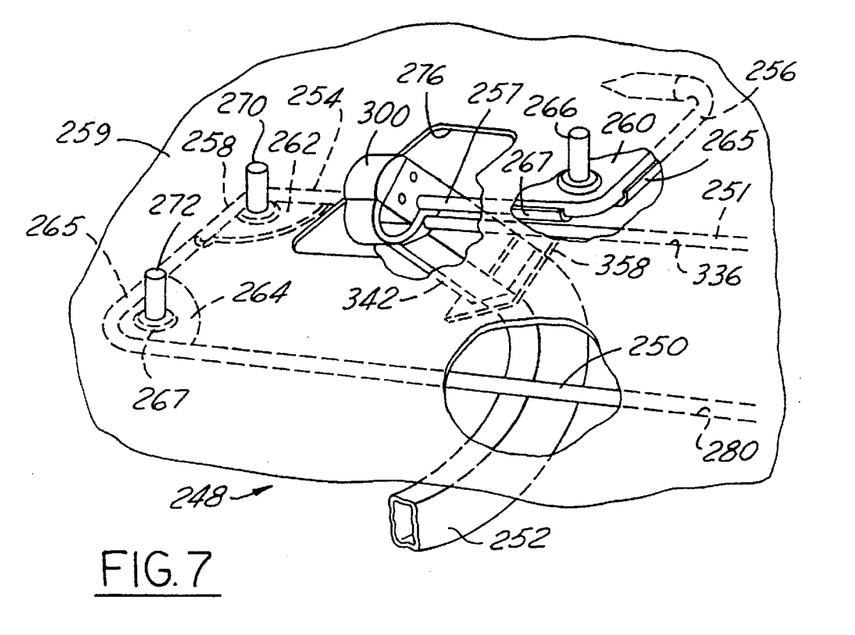
FIG. 7 is a perspective view, partially in cutaway, of a hinge strap assembly utilizing a portion of a torque rod as a hinge pin to mount the hinge strap assembly to the back shelf of a vehicle.

An S-shaped first end portion 254 of torque rod 250 having segments 256, 257 and 258 is supported beneath a rear shelf 259 of vehicle body 26. Three brackets 260, 262 and 264 are bolted on rear shelf 259 by respective fasteners 266, 270 and 272 to mount segments 256, 257 and 258 to rear shelf 259. Each of brackets 260, 262 and 264 have a respective pair of U-shaped clamp members 265 and 267 formed thereon which clampingly receive segments of first end portion 254. First end portion 254 is generally planar, although it need not be, and is clamped to rear shelf 259. Therefore this portion of torque rod 250 is generally fixed against rotation and does not store torsional energy. Segment 257 of first end portion 254 extends through a proximate end of hinge strap 252. A rectangular opening 276 is formed in rear shelf 259 through which the proximate end of hinge strap 252 extends. A transverse portion 280 extends over to the other hinge strap assembly.

Figures 8, 9, 10:
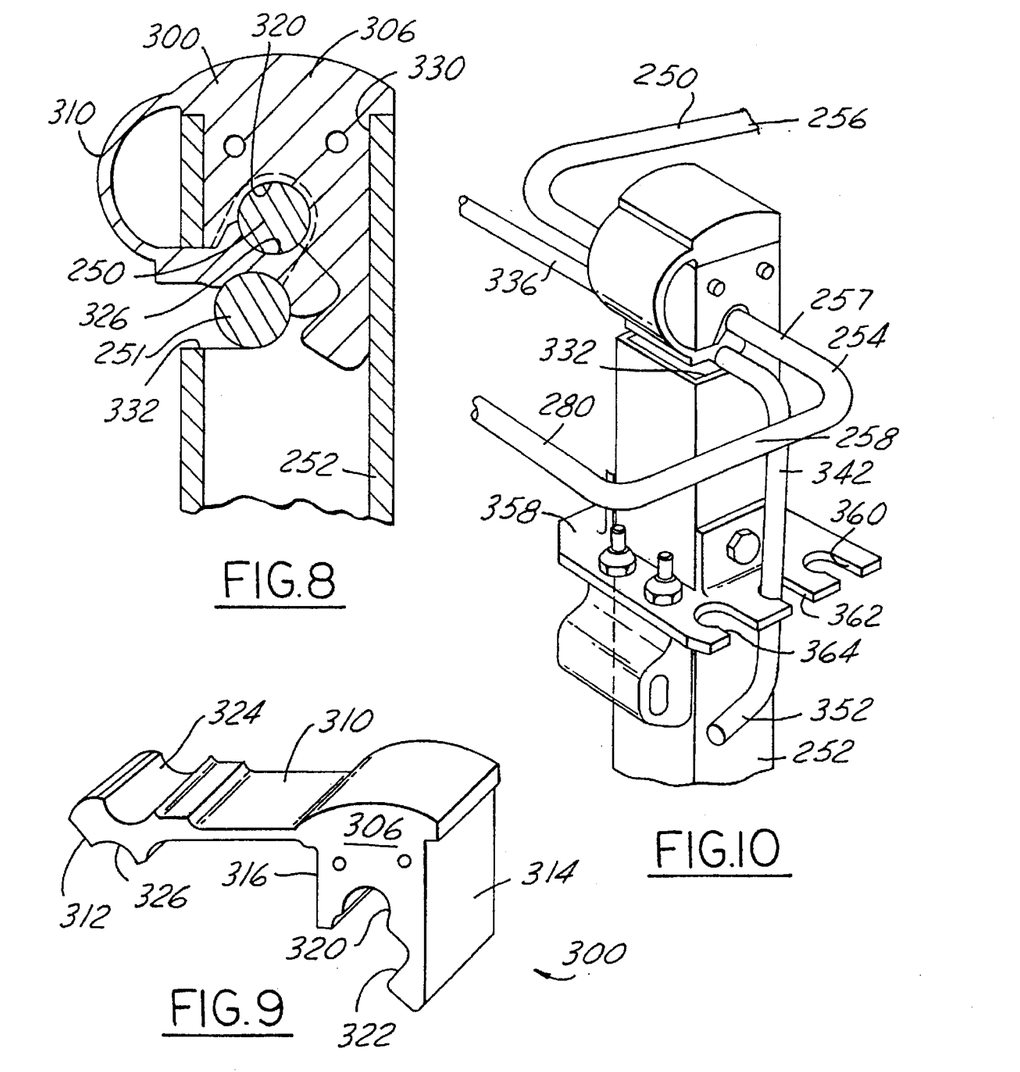
FIG. 8 is a fragmentary side sectional view of a first embodiment of an insert in a hinge strap retaining portions of a pair of torque rods.
FIG. 9 is a perspective view of the insert used in the hinge strap assembly of FIG. 8.
FIG. 10 is a fragmentary perspective view of the hinge strap assembly of FIG. 7.

Referring to FIGS. 8–10, a plastic insert 300 is shown which retains torque rods 250 and 251 in hinge strap 252. A plastic extrusion may be made and then cut into appropriate thicknesses producing insert 300, an example of which is shown in FIG. 9. insert 300 includes a main body 306, a strap portion 310 and a retainer portion 312. Main body 306 includes planar first and second walls 314 and 316 and a pair of adjacent grooves 320 and 322 for holding portions of torque rods 250 and 251. Strap portion 310 connects main body 306 with retainer portion 312. Retainer portion 312 has a pair of grooves 324 and 326 located on opposing sides of retainer portion 312.

Hinge strap 252 is rectangular in cross-section. A top opening 330 is located in the top of hinge strap 252 for receiving main body 306. On the side of hinge strap 252 is formed a slot 332.

Torque rod 250 is supported as shown in FIG. 7 using brackets 260, 262 and 264 (not shown in FIG. 10). Torque rod 251 has a transverse portion 336, corresponding to elongate portion 280 of torque rod 250. Torque rod 251 also includes a descending portion 342 and a terminal portion 352.

In operation, main body 306 is slid into top opening 330 with strap portion 310 and retainer portion 312 extending thereabove. Segment 257 of first end portion 254 is positioned in groove 320 of insert 300 prior to this insertion. Then retainer portion 312 is flexed and inserted into slot 332 in hinge strap 252 with groove 320 capturing segment 257 in opposition with groove 326. Next groove 324 is snapped over transverse portion 336 to wedgingly capture insert 300 and torque rod 251 inside hinge strap 252.

A bracket 358 with a plurality of notches 360, 362 and 364 thereon is bolted to strap 252. Descending portion 342 is anchored in one of the notches, preferably notch 362 to establish a preload. First end portion 254 is clamped to rear shelf 259 as has been described previously with respect to FIG. 7. A bumper 366 may also be attached to strap 252 or bracket 358.

Figure 11A:
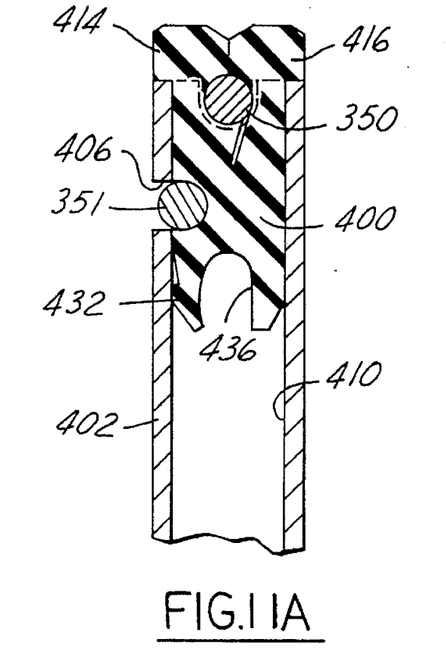
FIGS. 11A and 11B are fragmentary sectional views of a hinge strap with a second embodiment of an insert therein for retaining portions of a pair of torque rods.
Figure 11B:
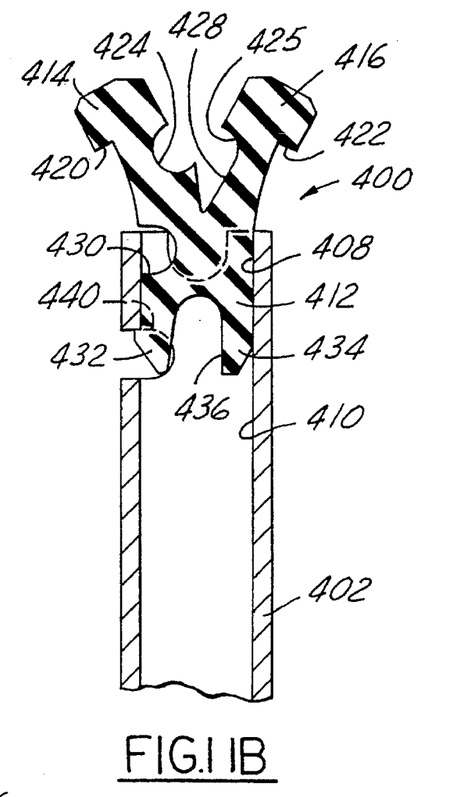
Figure 12:
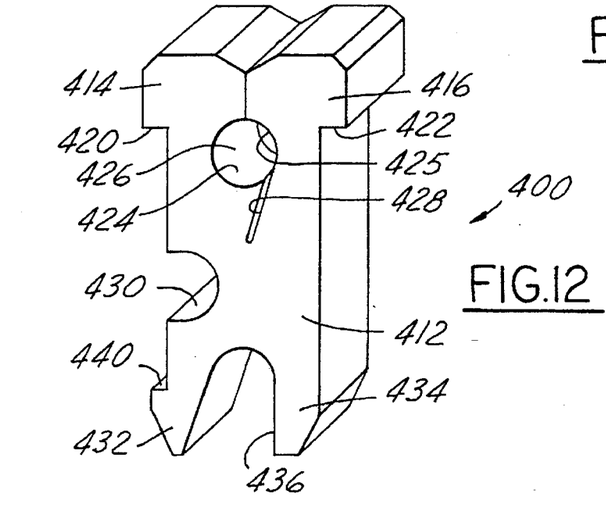
FIG. 12 is a perspective view of the insert utilized in FIGS. 11A and 11B.

FIGS. 11A, 11B and 12 show an alternative insert 400 which locates in a proximate end of a hinge strap 402 to retain torque rods 350 and 351 therein. An elongate slot 406 is cut into hinge strap 402. A top opening 408 in hinge strap 402 receives insert 400.

As best seen in FIG. 12, insert 400 includes upper legs 414 and 416, each having a respective step 420 and 422 therebeneath. A first groove 424 on upper leg 414 and a second arcuate surface 425 on upper leg 416 cooperate to define a retaining aperture 426. Further, a slit 428 allows upper legs 414 and 416 sufficient flexibility to significantly separate from one another.

Located along one side of insert 400 is retaining groove 430 which is sized to receive torque rod 351. Lower legs 432 and 434 define the bottom portion of insert 400 and form a U-shaped slot therebetween. Note lower legs 432 and 434 are tapered to facilitate insertion into top opening 408. Located above lower leg 432 is a retaining step 440. Step 440 is designed to cooperate with slot 406 to prevent withdrawal of insert 400 from hinge strap 402.

In operation, insert 400 is partially inserted into the top of hinge strap 402 with lower legs 432 and 434 sliding within hinge strap 402 until retaining step 440 engages elongate slot 406. Upper legs 414 and 416 are then separated and torque rod 350 is inserted into aperture 426. Insert 400 is further inserted into hinge strap 402 until steps 420 and 422 flushly mate with the end of hinge strap 402. This insertion causes upper legs 414 and 416 to abut one another and aperture 426 to close capturing torque rod 350. At this point, groove 430 aligns with slot 406 allowing torque rod 351 to be retained in groove 430. As in FIG. 10, a descending portion 342 will be captured in a retaining bracket 358 to prevent withdrawal from slot 406.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

For example, the convoluted torque rod spring assemblies could be used with other than vehicle applications such as with building doors or the like. Also, boxless hinge assemblies utilizing inserts 300 or 400 can be used to anchor the ends of a single convoluted torque rod rather than using two separate criss-crossing torque rods as in FIG. 7.

What is claimed is:

1. A torque rod spring assembly comprising:
   a torque rod having a first end portion, a second end portion and a convoluted portion extending therebetween, the convoluted portion including at least two generally parallel legs and a U-shaped bight portion connected therebetween, the first and second end portions extending generally perpendicular to the respective at least two legs of the convoluted portion; and
   a slider block having at least two bores therein through which the at least two legs extend and being adjustably clampable along the at least two legs of the convoluted portion so that the spring rate of the torque rod spring assembly may be varied.

2. The torque rod spring assembly of claim 1 further comprising:
   a pivot block having at least two apertures therein through which the at least two legs of the convoluted portion pass with the first and second end portions extending generally perpendicular to the axis of the apertures;
   wherein the first and second end portions can be translated through an arc relative to the pivot block causing the convoluted portion to twist in torsion storing energy.

3. The torque rod spring assembly of claim 2 wherein the slider block is located intermediate between the pivot block and the U-shaped bight portion.

4. The torque rod spring assembly of claim 2 wherein the pivot block is adjustably clampable along the convoluted portion to change the spring rate of the torque rod spring assembly.

5. The torque rod spring assembly of claim 1 wherein:
   the convoluted portion includes at least four generally parallel legs and at least three U-shaped bight portions connected therebetween; and
   the slider block has at least four bores therein.

6. A boxless hinge assembly for pivotally supporting a deck lid on the rear shelf of a vehicle body comprising:
   first and second pairs of hinge straps each having one strap for attachment to the deck lid and a cooperating strap for attachment to the rear shelf; and
   torque rod means having a first end secured to the rear shelf with a pivot portion adjacent thereto extending between cooperating straps of one pair to pivotally connect such pair for pivoting the deck lid on the rear shelf, and said torque rod means having a second end connected to that strap of a pair attached to the deck lid whereby the torque rod means is tensioned when the deck lid is closed and assists when the deck lid is opened.

7. The boxless hinge assembly of claim 6 wherein the torque rod means comprises:
   first and second torque rods each having a first end with a pivot portion adjacent thereto, and a second end;
   wherein the first torque rod has its first end secured to the rear shelf with its pivot portion extending between cooperating straps of the first pair of hinge straps to provide a pivot therebetween and its second end connected to the second pair of hinge straps;
   wherein the second torque rod has its first end secured to the rear shelf with its pivot portion extending between cooperating straps of the second pair of hinge straps to provide a pivot therebetween and its second end connected to the first pair of hinge straps.

8. The boxless hinge assembly of claim 7 further comprising an insert mounted within the cooperating strap for attachment to the rear shelf of the first pair of hinge straps, the pivot portion of the first torque rod extending through the insert and allowing for pivotal movement between the first pair of hinge straps and the first torque rod.

9. The boxless hinge assembly of claim 8 wherein the second end of the second torque rod extends through the insert within the first pair of hinge straps.

10. The boxless hinge assembly of claim 8 wherein the insert includes a main body and a retainer portion, the main body cooperating with the retainer portion to pivotally capture the pivot portion of the first torque rod.

11. The boxless hinge assembly of claim 8 further comprising a second insert mounted within the cooperating strap for attachment to the rear shelf of the second pair of hinge straps, the pivot portion of the second torque rod extending through the second insert and allowing for pivotal movement between the second pair of hinge straps and the second torque rod.

12. The boxless hinge assembly of claim 6 further comprising a bracket with a plurality of notches, wherein the bracket is attached to the first pair of hinge straps, wherein the second end of the second torque rod has a descending portion adjustably anchored in one of the plurality of notches of the bracket to establish a preload on the second torque rod.

13. The boxless hinge assembly of claim 6 further comprising first and second brackets adapted to secure the first end of the first torque rod to the rear shelf, the one pair of hinge straps pivotally connected to the pivot portion intermediate the first and second brackets.

14. The boxless hinge assembly of claim 6 wherein the torque means comprises:
   a torque rod having a first end with a pivot portion adjacent thereto, and a second end;
   wherein the torque rod has its first end secured to the rear shelf with its pivot portion extending between cooperating straps of the first pair of hinge straps to provide a pivot therebetween and its second end connected to the first pair of hinge straps.

15. The boxless hinge assembly of claim 14 wherein the torque rod has a convoluted portion extending between the second end and the pivot portion, the convoluted portion having at least two generally parallel legs and at least one U-shaped bight portion connected therebetween.

16. The boxless hinge assembly of claim 15 wherein the convoluted portion includes at least four legs and at least three U-shaped bight portions connected therebetween.

17. The boxless hinge assembly of claim 14 further comprising an insert mounted within the cooperating strap for attachment to the rear shelf of the first pair of hinge straps, the pivot portion of the torque rod extending through the insert and allowing for pivotal movement between the first pair of hinge straps and the torque rod.

18. The boxless hinge assembly of claim 17 wherein the second end of the torque rod extends through the insert.

19. The boxless hinge assembly of claim 17 wherein the insert includes a main body and a retainer portion, the main body cooperating with the retainer portion to pivotally capture the pivot portion of the torque rod.

20. The boxless hinge assembly of claim 14 further comprising a bracket with a plurality of notches, wherein the bracket is attached to the first pair of hinge straps, wherein the second end of the torque rod has a descending portion adjustably anchored in one of the plurality of notches of the bracket to establish a preload on the torque rod.

21. The boxless hinge assembly of claim 6 further comprising first and second brackets adapted to secure the first end of the torque rod to the rear shelf, the first pair of hinge straps pivotally connected to the pivot portion intermediate the first and second brackets.

\* \* \* \* \*